March 2, 1965 P. SCHÖNFELD 3,171,441
MIXING VALVES FOR HOT AND COLD WATER
Filed Aug. 23, 1961
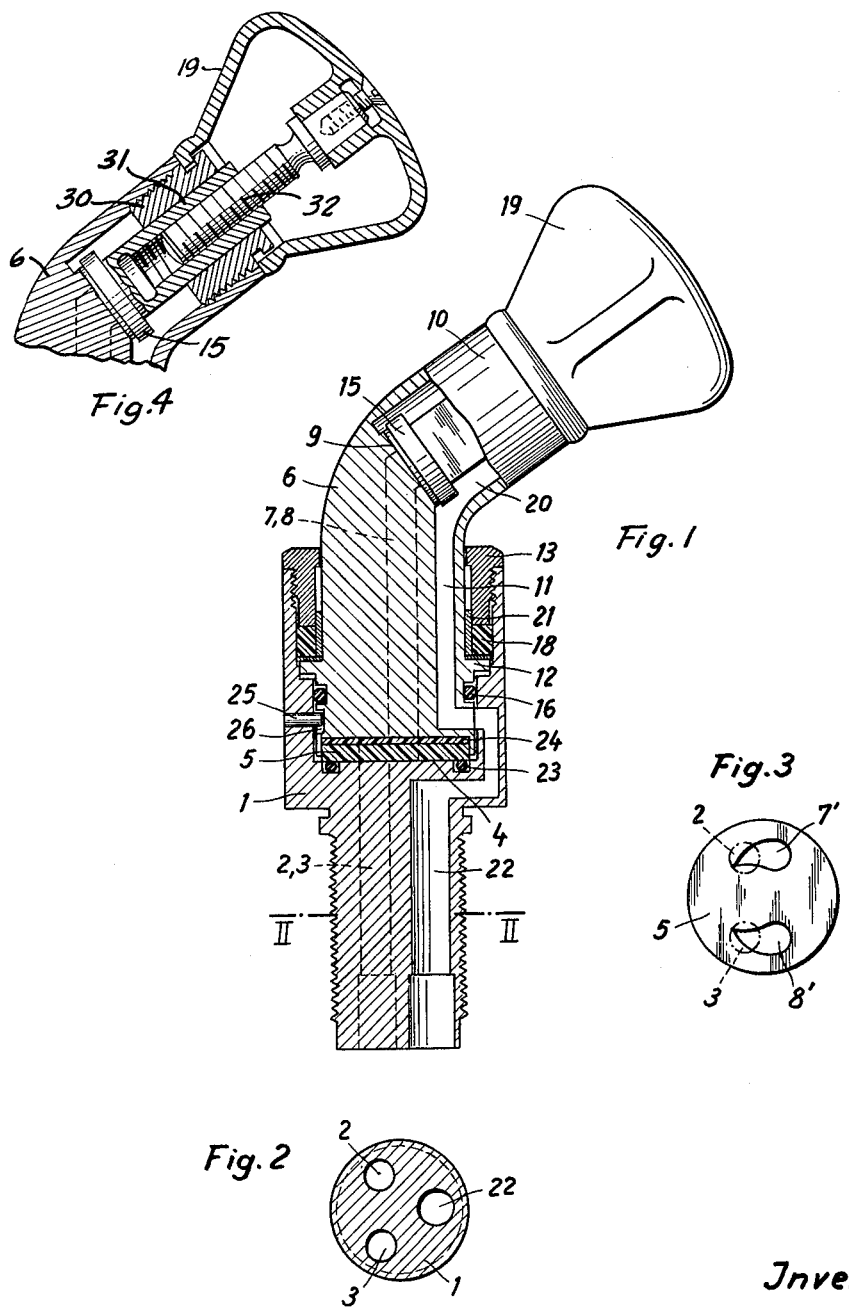
Inventor
PAUL SCHÖNFELD United States Patent Office 3,171,441
Patented Mar. 2, 1965

3,171,441
MIXING VALVES FOR HOT AND COLD WATER
Paul Schönfeld, Lobberich, Rhineland, Germany, assignor to Rokal G.m.b.H., Lobberich, Rhineland, Germany, a body corporate of Germany
Filed Aug. 23, 1961, Ser. No. 133,486
Claims priority, application Germany, Jan. 13, 1961, R 21,629
6 Claims. (Cl. 137—637.4)

This invention relates to improvements in mixing valves for hot and cold water for use in bath tubs, wash basins, sinks and the like.

Such valves have the particular advantage of a simple and convenient service because they allow of the carrying out of all necessary manipulations by only one hand on one handle and are, moreover, very compact.

The object of the invention is to provide a valve which, in addition to the simplicity of its manipulation and the simplest possible construction, is reliable in its mode of operation.

According to the invention the valve comprises a body, inlet passageways therethrough, a handle rotatably mounted in the body, inlet passageways therethrough, a regulator disc mounted on the end of the handle and formed with elongated apertures of greater area than the apertures in the handle, a screwed control valve in the handle to allow water from the inlets to mix, a mixing chamber in the handle and a discharge passageway in the body, and peripheral grooves in the handle and body to maintain a through way from the mixing chamber to the body outlet for any position of the handle relatively to the body.

A special advantage of this arrangement lies in that the handle can be rotated as a regulator even when the access passageways in the handle are closed by the valve in the chamber of the handle, and in that it is possible to maintain a set mixture ratio of cold water and hot water once determined by appropriate rotation of the handle irrespective of intermediate stopping of the outflow of water, because the outflow of water can be stopped by turning the grip knob independently of the position of the handle relatively to the body.

Of special importance is the arrangement of the flexible intermediate disc between the regulating disc and the end of the handle; because this flexible intermediate disc guarantees the firm and tight seating of the regulating disc on the plane surface in the valve body into which the water inlets of the valve body lead. Without the flexible intermediate disc there might be difficulty in obtaining a firm and tight seating of the regulating disc due to a one-sided loading of the handle or in inaccuracies in the guiding arrangement of the handle.

For the same reason it is expedient to fit, in the plane surface of the valve body into which the passageways of the valve body lead, an additional flexible sealing ring so that the outlets of the passageways lie in the plane surface enclosed thereby.

The invention will be described with reference to the accompanying drawings showing an example of the valve limited to the parts necessary for understanding the invention.

FIG. 1 shows a vertical section through the valve;
FIG. 2 is a section through line II—II in FIG. 1;
FIG. 3 shows a detail of the regulating disc; and
FIG. 4 shows the valve structure of FIGURE 1 including the details of the screw spindle in the handle knob.

The valve termed the mixer member consists of a body 1 with the inlet passages 2 and 3, one of which is for hot water and the other for cold water. The inlet passages lead into a seating surface 4 over which is applied a regulating disc 5. The disc 5 is made of a synthetic substance, as for example plastic material, and is held against the seating surface by a handle stem 6. The disc 5 regulates the intake of water from the two inlet channels 2, 3 and has two apertures 7' and 8'. These apertures 7', 8' are elongated and of greater area than the apertures 7, 8 and are so shaped that they allow varying quantities of hot water and of cold water to pass simultaneously or only cold water or only hot water according to the degree of rotation of disc 5 with respect to passageways 2 and 3.

The handle 6 engages the closing disc 5 in the body 1. The handle 6 is rotatable about its axis in the valve body. Two passageways 7, 8 are formed in the handle 6 parallel to the axis, the openings in the passageways coinciding with the orifices 7', 8' or the greater part thereof in the regulator disc 5. The regulator disc 5 is mounted to rotate with the handle 6. A pin 25 is provided in valve body 1 to engage with an external slot 26 in handle 6. The length of the slot 26 determines the size of the angle of rotation of handle 6.

A collar 12 is provided on the handle 6. A sealing ring 16 lies in a peripheral groove under the collar 12. A flexible cylindrical ring 18 made for example of rubber and fitted between the collar 12 and the ring nut 13 presses the handle 6 and the regulator disc 5 against seating surface 4. Between the flexible pressure member 18 and the handle 6 there is a metal sleeve 21. The sleeve 21 fits into the bore of the ring nut 13.

The passageways 7 and 8 in the handle terminate in a seating surface 9 on the side remote from valve body 1. Against this seating surface 9 bears a valve cone 15 arranged in a chamber 20 which closes the passageways 7 and 8, the cone 15 being fixed to a screw spindle numeral 30 in the hand piece 10. This screw spindle has an inner threaded wall portion 31 which is engaged by the threads of a screw bolt 32 secured to the handle knob 19. A hand knob 19 is provided to turn the spindle in the hand piece 10.

The valve cone 15 is housed in the chamber 20 from which a passageway 11 in the handle 6 leads to the valve body 1 from which, for example, an outlet passageway 22 leads to a discharge spout (not shown). A through way is thus provided for any position of rotation of the handle 6 from the passageway 11 to the passageway 22 which are connected by a peripheral groove in the handle 6 communicating with an internal groove in the valve body 1.

A flexible washer 24 formed with holes corresponding with the end of the passageways 7, 8 is provided between the disc 5 and the front end of handle 6.

There is also provided in the seating surface 4 of the valve body 1 a further supplementary packing in the form of a flexible packing ring 23, for example, of round section. The outlets from the passageways 2 and 3 lie in the circular surface enclosed by the ring 23.

The manner of operation of the valve is as follows:

By a turn of the handle 6 about its axis a part of the cross section of the inlets 2 and 3 is opened through orifices 7', 8' in the regulator disc 5 so that water can flow into passageways 7 and 8 in the handle. According to the amount of rotation of the regulator disc 5 more hot water or more cold water flows out of inlets 2 and 3. Lifting the valve cone 15 by turning hand knob 19 causes water to flow from both passageways 7 and 8 into the chamber 20 where mixing takes place, the water flowing through the passageway 11 in the valve body and thence through the passageway 22 to the discharge spout.

I claim:
1. A mixing valve for mixing hot and cold water having a single valve operating handle, a valve housing having axially extending hot and cold water inlet canals and corresponding hot and cold water inlet openings, said operating handle having a shaft extending into said valve housing, rotatable slide means at the inner end of said shaft for regulating the flow through said hot and cold water inlet canals, said rotatable slide means having passageways for the hot and cold water, flow canals in said shaft communicating with said passageways and extending substantially axially of said shaft, a mixing chamber in said shaft adjacent its outer end, said flow canals having outlet openings merging into said mixing chamber, a handle knob rotatably mounted on said operating handle and having a threaded extension projecting into said mixing chamber, a sleeve member threadedly engaging said extension, a valve cone fixed to said sleeve member and adapted to seat against the outlet openings of said flow canals, and a discharge canal in said shaft leading from said mixing chamber into a communicating discharge canal in said valve housing.

2. A mixing valve according to claim 1 wherein said discharge canal in said valve housing extends substantially parallel to said hot and cold water inlet canals.

3. A mixing valve according to claim 1 wherein a flow regulator disc is fixed to the inner end of said handle shaft which forms said rotatable slide means, said regulator disc facing said water inlet openings and having openings corresponding to the passageways in said rotatable slide means.

4. A mixing valve according to claim 3 wherein an elastic washer is arranged between the flow regulator disc and the end of the shaft forming the rotatable slide means.

5. A mixing valve according to claim 1 wherein the valve housing has a flat seating surface facing the inner end of said handle shaft constituting said rotatable slide means, a circular recess in said seating surface and a resilient packing ring lodged in said circular recess.

6. A mixing valve according to claim 5 wherein the openings of said inlet canals adapted to communicate with the passageways in said rotatable slide member are disposed inside the circular surface enclosed by said resilient ring member.

References Cited by the Examiner
UNITED STATES PATENTS

| 557,395 | 3/96 | Kelley | 251—316 XR |
| 1,429,199 | 9/22 | Finney | 137—636.3 |
| 2,214,619 | 9/40 | Krieger | 137—636.3 |
| 2,309,900 | 2/43 | Herring | 137—605 XR |
| 2,766,774 | 10/56 | Morward | 137—636.3 |
| 2,983,279 | 5/61 | Biermann | 137—637.4 XR |

ISADOR WEIL, *Primary Examiner*.